United States Patent
Chung

(10) Patent No.: US 10,962,071 B2
(45) Date of Patent: Mar. 30, 2021

(54) ELECTRONIC PARKING BRAKE SYSTEM AND CONTROL METHOD THEREOF

(71) Applicant: MANDO CORPORATION, Gyeonggi-do (KR)

(72) Inventor: Seokhwan Chung, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 16/689,040

(22) Filed: Nov. 19, 2019

(65) Prior Publication Data
US 2020/0166096 A1 May 28, 2020

(30) Foreign Application Priority Data

Nov. 22, 2018 (KR) .................. 10-2018-0145365

(51) Int. Cl.
| | | |
|---|---|---|
| *F16D 66/02* | (2006.01) | |
| *B60T 17/22* | (2006.01) | |
| *B60T 8/171* | (2006.01) | |
| *B60T 13/74* | (2006.01) | |

(52) U.S. Cl.
CPC ............ *F16D 66/023* (2013.01); *B60T 8/171* (2013.01); *B60T 13/74* (2013.01); *B60T 17/221* (2013.01)

(58) Field of Classification Search
CPC ........ F16D 66/023; B60T 8/171; B60T 13/74; B60T 17/221
See application file for complete search history.

(56) References Cited

U.S. PATENT DOCUMENTS

| | | | |
|---|---|---|---|
| 2010/0207608 A1* | 8/2010 | Erickson | F16D 66/026 324/207.13 |
| 2015/0354652 A1* | 12/2015 | Wong | F16D 66/023 73/129 |
| 2017/0276199 A1* | 9/2017 | Yabusaki | B60T 17/221 |

FOREIGN PATENT DOCUMENTS

| | | |
|---|---|---|
| JP | 6338999 | 6/2018 |
| KR | 10-2005-0117223 | 12/2005 |

* cited by examiner

*Primary Examiner* — Travis R Hunnings
(74) *Attorney, Agent, or Firm* — Ladas & Parry, LLP

(57) ABSTRACT

Disclosed herein is an electronic parking brake system and a control method thereof. The electronic parking brake system includes a pair of brake pads arranged on opposite sides of a brake disc, a piston configured to press at least one of the brake pads, a nut member configured to press the piston, a spindle member configured to move the nut member, an electric motor configured to rotate the spindle member, and a controller configured to estimate a wear amount of the brake pads based on change in a movement distance of the nut member.

14 Claims, 8 Drawing Sheets

[FIG. 1]
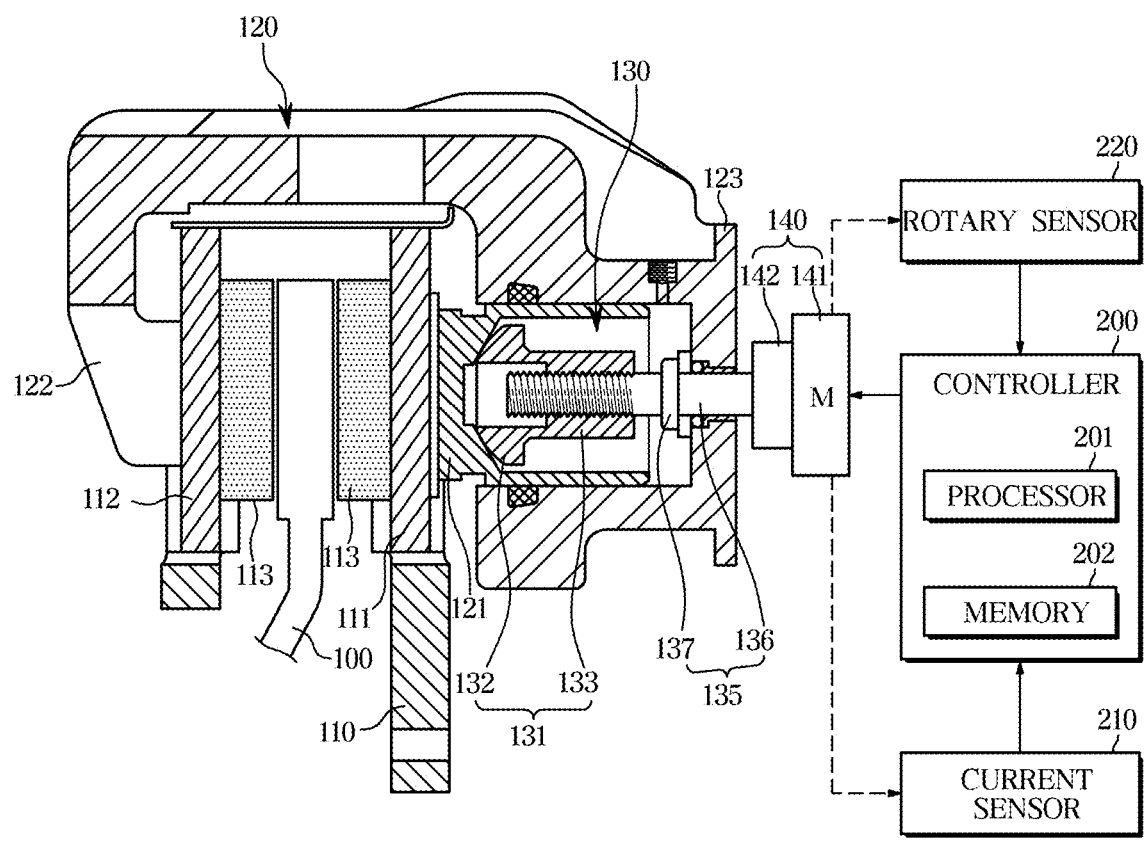

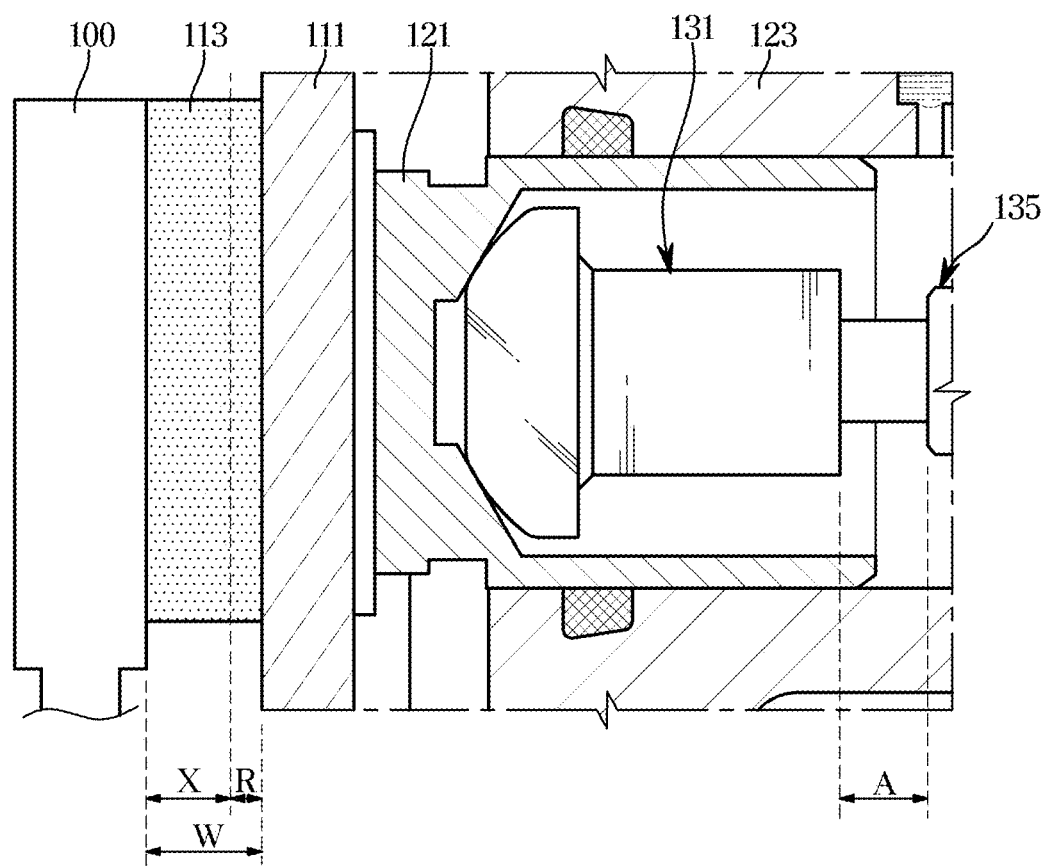
[FIG. 2]

【FIG. 3】
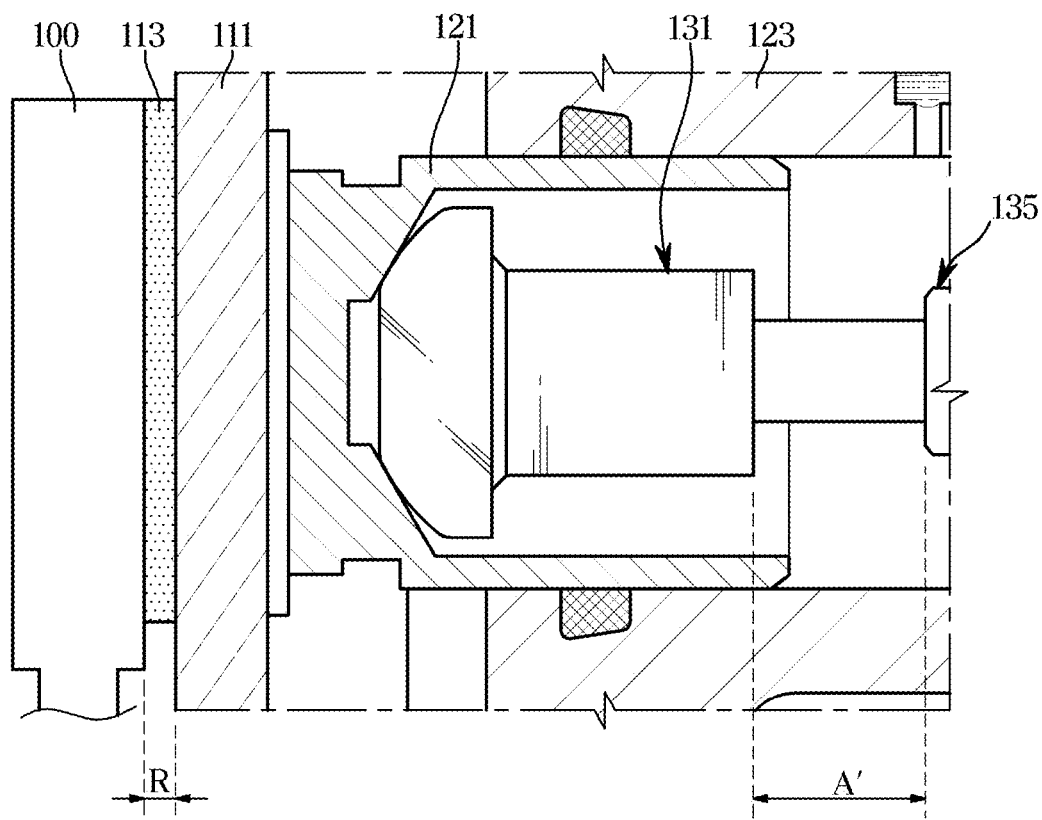

[FIG. 4]
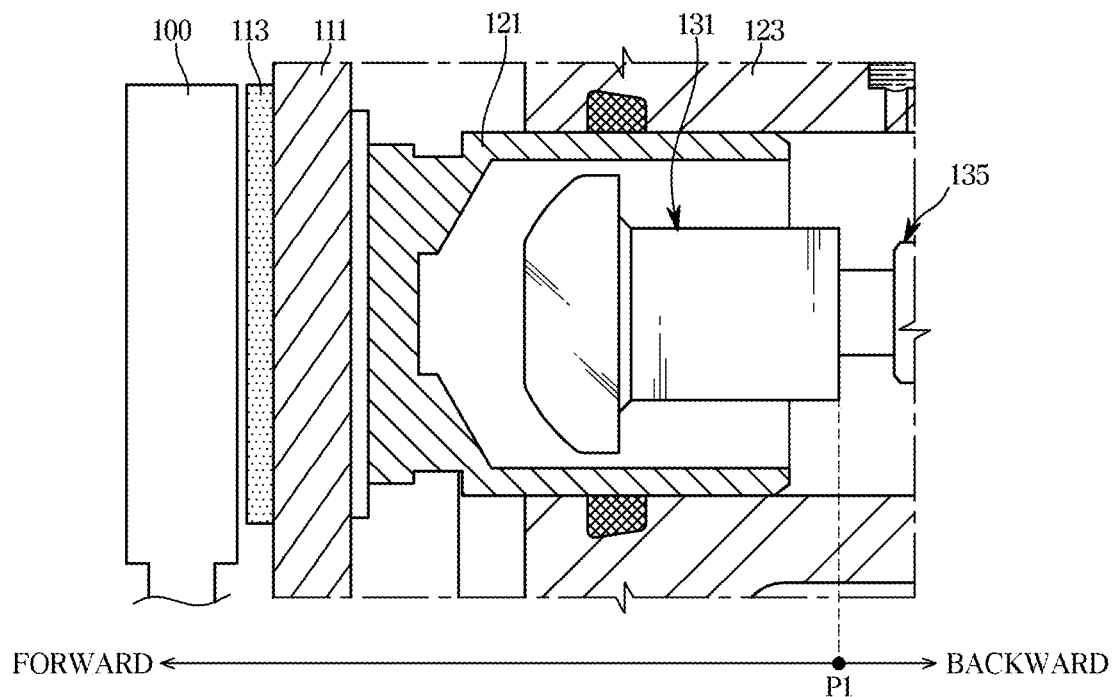
FORWARD ← → BACKWARD

[FIG. 5]
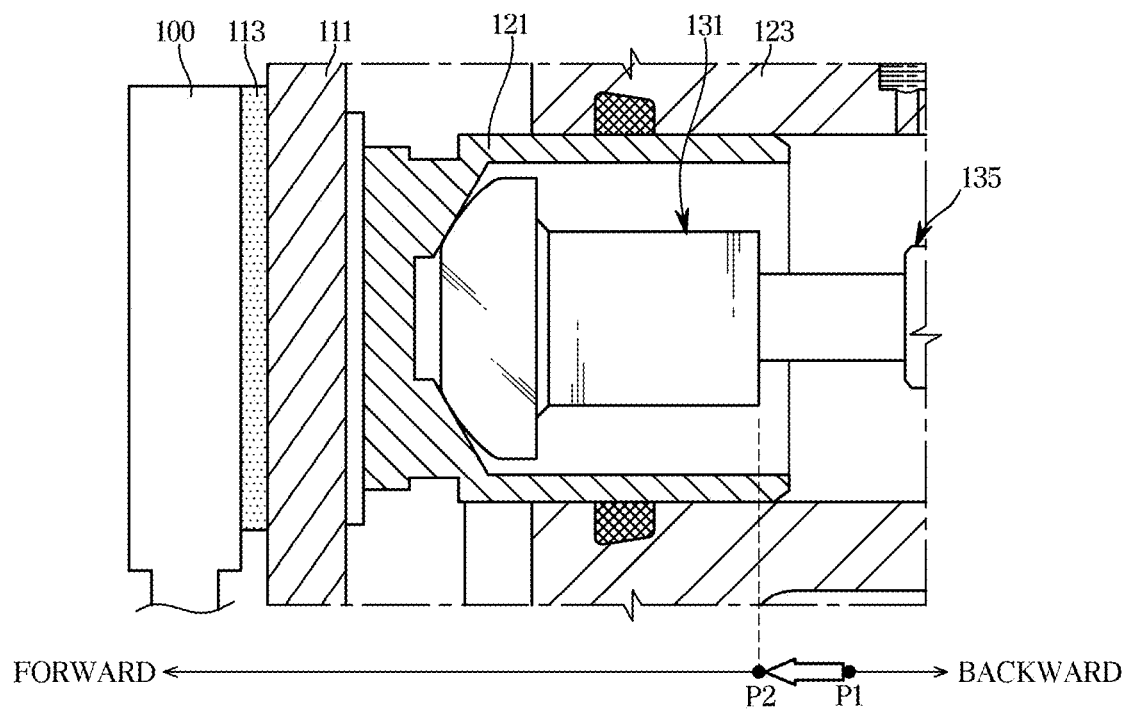

[FIG. 6]
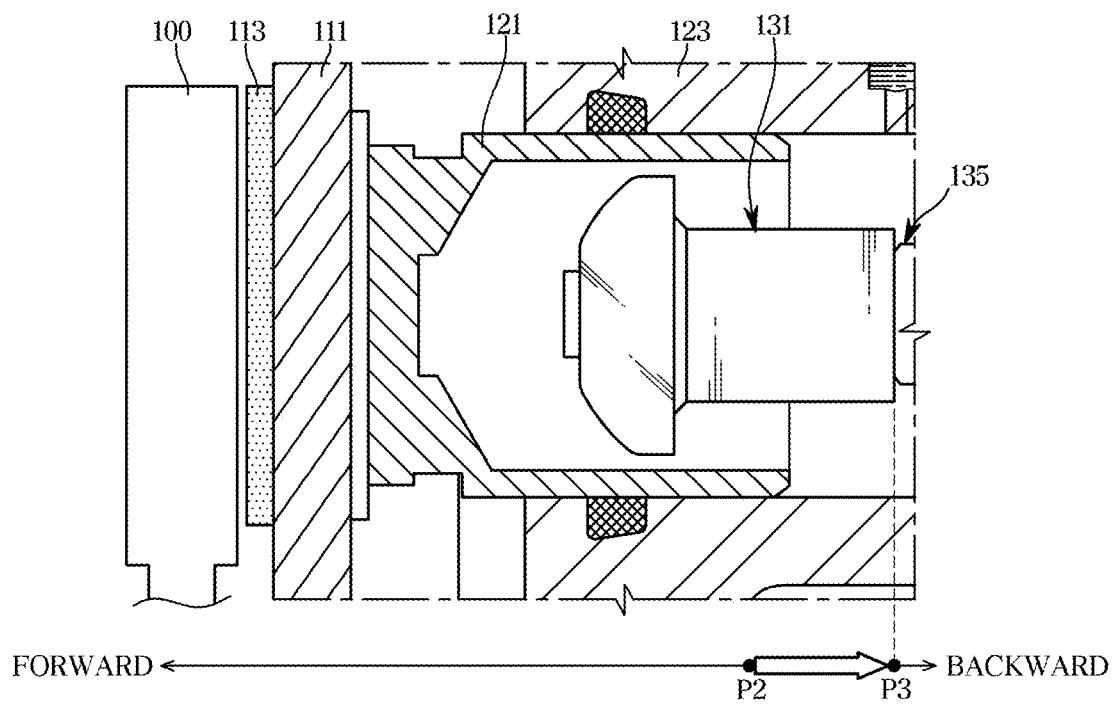

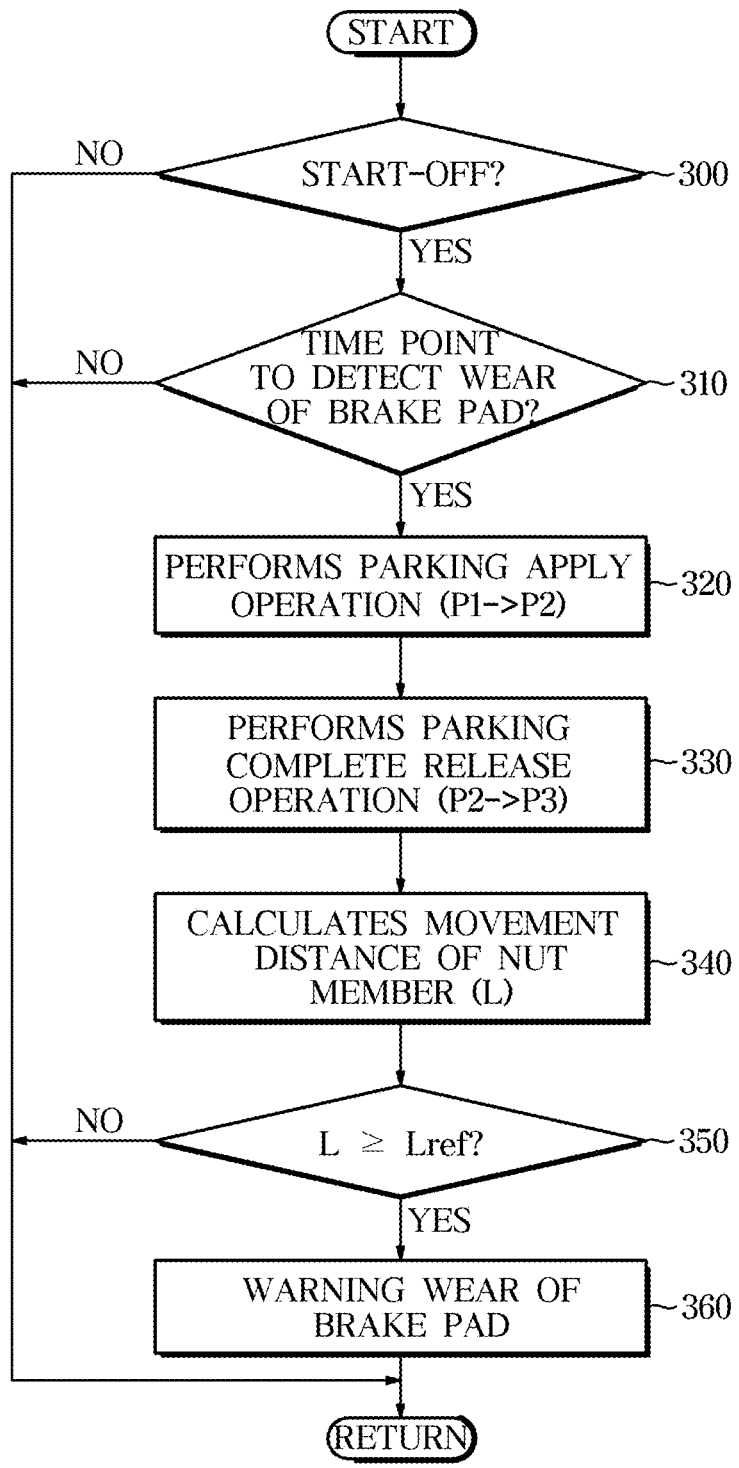
[FIG. 7]

【FIG. 8】
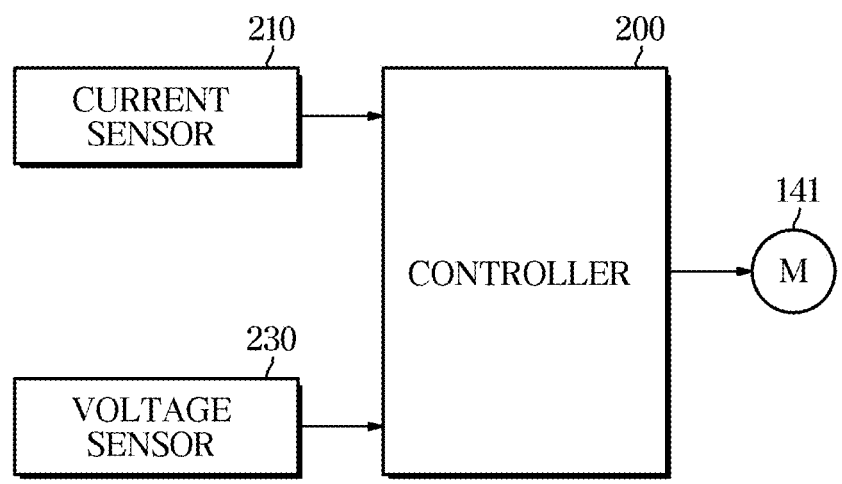

ELECTRONIC PARKING BRAKE SYSTEM AND CONTROL METHOD THEREOF

CROSS-REFERENCE TO RELATED APPLICATION(S)

This application claims the benefit of Korean Patent Application No. 2018-0145365, filed on Nov. 22, 2018 in the Korean Intellectual Property Office, the disclosure of which is incorporated herein by reference.

BACKGROUND

1. Technical Field

The present disclosure relates to an electronic parking brake system and a control method thereof, and more particularly, to an electronic parking brake system for controlling the activation or deactivation of the electronic parking brake and a control method thereof.

2. Description of the Related Art

In general, a vehicle performs braking by a friction force between a brake disc of a wheel and brake pads reducing a rotational force of the wheel. While the vehicle performs braking, the brake pads are worn in proportion to a braking force.

When the brake pads are worn at a certain level or more, direct friction may occur between brake pad plates and the brake disc, resulting in defects in the brake disc and noise, as well as a reduced braking force.

Conventionally, a brake pad wear sensor is installed on the brake pads for detecting a wear amount of the brake pads, and when the brake pads are worn at the certain level or more by sensing the wear amount of the brake pads through the brake pad wear sensor, replacement timing of the brake pads is informed to a driver.

However, a conventional brake pad wear sensor needs to be installed on the brake pads, which not only adds to the sensor cost but also requires an electrical wiring, and further the installation and assembly are complicated and the product cost may be increased.

SUMMARY

It is an aspect of the present disclosure to provide an electronic parking brake system and a control method thereof capable of detecting a wear amount of brake pads more efficiently.

Additional aspects of the present disclosure will be set forth in part in the description which follows and, in part, will be obvious from the description, or may be learned by practice of the disclosure.

In accordance with one aspect of the present disclosure, an electronic parking brake system includes a pair of brake pads arranged on opposite sides of a brake disc; a piston configured to press at least one of the brake pads; a nut member configured to press the piston; a spindle member configured to move the nut member; an electric motor configured to rotate the spindle member; and a controller configured to estimate a wear amount of the brake pads based on change in a movement distance of the nut member.

Further, the controller may move the nut member from a parking operation position in which the brake pads are pressed by a forward movement of the nut member to a parking complete release position in which the pressing on the brake pad is completely released by a backward movement of the nut member, and estimates the wear amount of the brake pads by comparing the movement distance of the nut member from the parking operation position to the parking complete release position with a preset distance.

Further, the parking complete release position may be a position in which the nut member moved backward is in close contact with the spindle member.

Further, the electronic parking brake system may further include a current sensor configured to detect a current flowing through the electric motor; wherein the controller detects the current flowing through the electric motor while moving the nut member in a reverse direction, and when a current value detected is greater than a preset value, the controller determines that the nut member has reached the parking complete release position.

Further, the electronic parking brake system may further include a current sensor configured to detect a current flowing through the electric motor; and a voltage sensor configured to detect a voltage input to the electric motor; wherein the controller determines a movement speed of the nut member based on the current and the voltage of the electric motor, and determines the movement distance of the nut member based on the determined movement speed and a movement time while the nut member reaches the parking complete release position from the parking operation position.

Further, the electronic parking brake system may further include a rotary sensor configured to detect a motor speed; wherein, the controller detects the motor speed while the nut member reaches the parking complete release position from the parking operation position, and determines the movement distance of the nut member according to the detected motor speed.

Further, the controller, when a vehicle is in a start-off state and a traveling distance of the vehicle is greater than a preset traveling distance, may estimate the wear amount of the brake pad based on a change in the movement distance of the nut member.

In accordance with another aspect of the present disclosure, an electronic parking brake system includes a pair of brake pads arranged on opposite sides of a brake disc; a piston configured to press at least one of the brake pads; a nut member configured to press the piston; a spindle member configured to move the nut member; an electric motor configured to rotate the spindle member; a current sensor configured to detect a current flowing through the electric motor; a voltage sensor configured to detect a voltage input to the electric motor; and a controller configured to drive the electric motor to move the nut member from a parking operation position to a parking complete release position when a vehicle is in a start-off state; determine a movement speed of the nut member based on the current and the voltage of the electric motor; determine a movement distance of the nut member based on the determined movement speed and a movement time of the nut member while the vehicle reaches the parking complete release position from the parking operation position; and estimate a wear amount of the brake pads by comparing the determined movement distance with a preset distance.

Further, the parking operation position may be a position of the nut member when the brake pad is pressed by a forward movement of the nut member, and the parking complete release position may be a position of the nut member when the pressing on the brake pad is fully released by a backward movement of the nut member.

Further, the parking complete release position may be a position in which the nut member moved backward is in close contact with the spindle member.

Further, the controller may detect a current value of the electric motor when the nut member moves forward, and determines whether a current position of the nut member is the parking operation position based on the detected current value, and the controller may detect the current value of the electric motor when the nut member moves backward, and determines whether the current position of the nut member is the parking complete release position based on the detected current value.

In accordance with another aspect of the present disclosure, a control method of the electronic parking brake system includes driving the electric motor to move the nut member from the parking operation position to the complete parking release position when the vehicle is in the start-off state; determining the movement speed of the nut member based on the current and the voltage of the electric motor; determining the movement distance of the nut member based on the determined movement speed and the movement time of the nut member while the nut member reaches the parking complete release position from the parking operation position; and estimating the wear amount of the brake pads by comparing the determined movement distance with the preset distance.

Further, in the nut member movement, wherein the parking operation position may be a position of the nut member when the brake pad is pressed by a forward movement of the nut member, and the parking complete release position may be a position of the nut member when the pressing on the brake pad is fully released by a backward movement of the nut member.

Further, in the nut member movement, wherein the parking complete release position may be a position in which the nut member moved backward is in close contact with the spindle member.

Further, the method may further include, in the nut member movement, when the nut member moves forward, detecting a current value of the electric motor and determining whether a current position of the nut member is the parking operation position based on the detected current value, and when the nut member moves backward, detecting the current value of the electric motor and determining whether the current position of the nut member is the parking complete release position based on the detected current value.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram illustrating an electronic parking brake system in accordance with an exemplary embodiment;

FIG. 2 is a view illustrating a parking apply operation when a brake pad is not worn in the electronic parking brake system in accordance with the exemplary embodiment;

FIG. 3 is a view illustrating the parking apply operation when the brake pad is worn in the electronic parking brake system in accordance with the exemplary embodiment;

FIG. 4 is a view illustrating a nut member in a parking operation standby position in the electronic parking brake system in accordance with the exemplary embodiment;

FIG. 5 is a view illustrating the nut member moving forward from the parking operation standby position to a parking operation position in the electronic parking brake system in accordance with the exemplary embodiment;

FIG. 6 is a view illustrating the nut member moved backward from the parking operation position to a parking complete release position in the electronic parking brake system in accordance with the exemplary embodiment;

FIG. 7 is a flowchart for a control method of the electronic parking brake system in accordance with the exemplary embodiment; and FIG. 8 is a block diagram illustrating an electronic parking brake system in accordance with another exemplary embodiment.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In order to clearly illustrate the present disclosure, parts not related to the description are omitted from the drawings, and in the drawings, the width, length, thickness, and the like of components may be exaggerated for the sake of convenience. Like reference numerals refer to like elements throughout the specification.

As an electronic parking brake system according to an exemplary embodiment, for example, a motor on caliper (MOC) type electronic parking brake system includes a motor actuator having an electric motor for generating a braking force, and a controller for driving the motor actuator. The controller may perform a parking apply operation to generate a parking braking force by driving the motor actuator or perform a parking release operation to release the generated parking braking force.

FIG. 1 is a schematic cross-sectional view illustrating an electronic parking brake system according to the exemplary embodiment.

Referring to FIG. 1, the electronic parking brake system may include a carrier 110 on which a pair of pad plates 111 and 112 are mounted so as to be movable forward and backward to press a brake disc 100 rotating together with a wheel of a vehicle, a caliper housing 120 slidably installed on the carrier 110 and provided with a cylinder 123 in which a piston 121 is installed to be moved forward and backward by braking hydraulic pressure, a power converter 130 pressing the piston 121, and a motor actuator 140 for transmitting a rotational force to the power converter 130.

The pair of pad plates 111 and 112 are composed of the inner pad plate 111 arranged to be in contact with the piston 121 and the outer pad plate 112 arranged to be in contact with a finger portion 122 of the caliper housing 120. The pair of pad plates 111 and 112 are installed on the carrier 110 which is fixed to a vehicle body so as to be moved back and forth toward opposite sides of the brake disc 100. In addition, a brake pad 113 is attached to one surface of each of the pad plates 111 and 112 facing the brake disc 100.

The caliper housing 120 is slidably installed on the carrier 110. More specifically, the caliper housing 120 includes the cylinder 123 at a rear portion thereof in which the power converter 130 is installed and the piston 121 is installed so as to be movable forward and backward, and the finger portion 122 at a front portion thereof that is formed to be bent downwardly to actuate the outer pad plate 112. The finger portion 122 and the cylinder 123 are integrally formed.

The piston 121 is provided in a cylindrical shape having a cup shape inside and inserted into the cylinder 123 so as to be slidable. The piston 121 presses the inner pad plate 111 against the brake disc 100 by an axial force of the power converter 130 that receives the rotational force of the motor actuator 140. Accordingly, when the axial force of the power converter 130 is applied, the piston 121 moves forward to press the inner pad plate 111 and the caliper housing 120 moves in an opposite direction to the piston 121 by a reaction force so that the finger portion 122 presses the outer pad plate 112 against the brake disc 100, thereby performing the braking.

The power converter 130 may serve to press the piston 121 against the inner pad plate 111 by receiving the rotational force from the motor actuator 140.

The power converter 130 may include a nut member 131 disposed in the piston 121 to be in contact with the piston 121, and a spindle member 135 threaded to the nut member 131.

The nut member 131 may be arranged in the piston 121 in a limited rotation state and is threaded with the spindle member 135.

The nut member 131 may include a head portion 132 provided to be in contact with the piston 121, and a coupling portion 133 which extends from the head portion 132 and is formed with an internal thread on an inner circumference surface thereof to be threaded with the spindle member 135.

The nut member 131 may move in a forward direction or a backward direction according to a rotating direction of the spindle member 135 and may serve to press and release the piston 121. At this time, the forward direction may be a movement direction in which the nut member 131 approaches the piston 121. The backward direction may be a movement direction in which the nut member 131 moves away from the piston 121. Alternatively, the forward direction may be a movement direction in which the piston 121 approaches the brake pads 113. The backward direction may be a movement direction in which the piston 121 moves away from the brake pads 113.

The spindle member 135 may include a shaft portion 136 which passes through the rear portion of the caliper housing 120 and is rotated by receiving the rotational force of the motor actuator 140, and a flange portion 137 extending from the shaft portion 136 in a radial direction. The shaft portion 136 may be rotatably installed at one end thereof by passing through the rear side of the cylinder 123, and the other end thereof may be arranged in the piston 121. At this time, one side of the shaft portion 136 penetrating the cylinder 123 is connected to an output shaft of a decelerator 142 to be transmitted the rotational force of the motor actuator 140.

The motor actuator 140 may include an electric motor 141 and the decelerator 142.

The electric motor 141 may rotate the spindle member 135 to move the nut member 131 forward and backward, thereby pressing or releasing the piston 121. The decelerator 142 may be provided between the output side of the electric motor 141 and the spindle member 135.

With the above configuration, the electronic parking brake system, in a parking apply operation mode, may press the piston 121 by rotating the spindle member 135 in one direction to move the nut member 131, using the motor actuator 140. The piston 121 pressed by the movement of the nut member 131 presses the inner pad plate 111 to bring the brake pad 113 into close contact with the brake disc 100, thereby generating the parking braking force.

In addition, the electronic parking brake system, in a parking release operation mode, moves the nut member 131 backward pressed by the piston 121 by rotating the spindle member 135 in the opposite direction, using the motor actuator 140. Pressing on the piston 121 is released by the backward movement of the nut member 131. Releasing the pressure to the piston 121 allows the brake pad 113 to be separated from the brake disc 100, thereby releasing the parking braking force generated.

In addition, the electronic parking brake system may include a controller 200 that performs overall control.

A current sensor 210 and a rotary sensor 220 may be electrically connected to an input side of the controller 200.

The current sensor 210 may be provided to detect a current flowing through the electric motor 141.

The current sensor 210 may detect a motor current flowing through the electric motor 141 using a shunt resistor or a hall sensor.

The current sensor 210 may be applied in various ways to detect the motor current in addition to the shunt resistor or the hall sensor.

The rotary sensor 220 is provided to detect a motor speed and/or rotation angle of the electric motor 141. The rotary sensor 220 may be applied in various ways such as power generation, electronic, oscillating, photoelectric, hall effect, magnetoresistance, and the like.

The controller 200 may be referred to as an electronic control unit (ECU).

The controller 200 may include a processor 201 and a memory 202.

The memory 202 may store a program for processing or controlling the processor 201 and various data for operating the electronic parking brake system.

The memory 202 may include a nonvolatile memory such as flash memory, read only memory (ROM), erasable programmable read only memory (EPROM), or the like, as well as a volatile memory such as static random-access memory (S-RAM) or dynamic random-access memory (D-RAM).

The processor 201 may control overall operation of the electronic parking brake system. The controller 200 with the above-described configuration may drive the electric motor 141. The controller 200 may rotate the electric motor 141 forwardly or reversely with a motor driving circuit for driving the electric motor 141.

The controller 200 may drive the electric motor 141 by an operation signal of a parking switch actuated by a driver or an operation signal generated by a program related to an electronic parking brake operation.

The controller 200 may perform the parking apply operation mode or the parking release operation mode according to the operation signal of the parking switch operated by the driver or the operation signal generated by the program related to the electronic parking brake operation.

The controller 200, in the parking apply operation mode, moves the nut member 131 in the forward direction to press the piston 121 by rotating the electric motor 141 in one direction, thereby closely contacting the brake pad 113 to the brake disc 100. Accordingly, the parking apply operation which generates the parking braking force may be performed.

The controller 200, in the parking release operation mode, moves the nut member 131 in the reverse direction to release the piston 121 by rotating the electric motor 141 in the opposite direction, thereby releasing the brake pad 113 which is closely contacted with the brake disc 100. Accordingly, the parking release operation which releases the parking braking force generated may be performed.

The controller 200 may include an algorithm for performing overall control of the electronic parking brake system, or a memory for storing data for a program reproducing the algorithm, and a microprocessor for implementing an operation necessary for controlling the electronic parking brake system using the data stored in the memory. The memory and the processor may be implemented as separate chips or a single chip.

FIG. 2 is a view illustrating a parking apply operation when a brake pad is not worn in the electronic parking brake system in accordance with the exemplary embodiment, and FIG. 3 is a view illustrating the parking apply operation when the brake pad is worn in the electronic parking brake system in accordance with the exemplary embodiment.

Referring to FIGS. 2 and 3, the controller 200 moves the nut member 131 in the forward direction by driving the electric motor 141 in the parking apply operation.

As the nut member 131 is moved in the forward direction, the piston 121 is pressed.

As the inner pad plate 111 moves to the brake disc side by the pressing of the piston 121, the brake pad 113 provided on the inner pad plate 111 presses the brake disc 100.

When the nut member 131 moves to a parking operation position, the controller 200 stops the electric motor 141 to maintain the nut member 131 in the parking operation position.

When the piston 121 is pressed by the movement of the nut member 131, the controller 200 determines whether a current position of the nut member 131 is the parking operation position according to a current value flowing through the electric motor 141.

In the case of the nut member 131 moves forward by driving the electric motor 141, when the nut member 131 moves in a state spaced apart from the piston 121, the amount of current flowing through the electric motor 141 is less. However, when the nut member 131 contacts the piston 121 to press the piston 121, the amount of current flowing through the electric motor 141 increases rapidly. As such, when the amount of current flowing through the electric motor 141 is greater than a preset value, it may be determined that the piston 121 is maximally pressed by the movement of the nut member 131. At this time, a position of the nut member 131 may be the parking operation position.

As the operation frequency of the electronic parking brake increases, a wear amount of the brake pad 113 increases.

When the thickness of the brake pad 113 becomes thin due to wear, a movement distance of the piston 121 increases as the thickness of the brake pad 113 becomes thin, so that the movement distance of the nut member 131 also increases. That is, the movement distance of the nut member 131 varies depending on the wear amount of the brake pad 113.

In the case no wear of the brake pad 113 has occurred, it is assumed that the thickness of the brake pad 113 is a normal thickness W and the movement distance of the nut member 131 is A in the parking apply operation.

When the brake pad 113 is worn from the normal thickness W to a wear thickness R, a maximum movement distance of the nut member 131 increases from A to A' in the parking apply operation. That is, the movement distance of the nut member 131 is increased by a thickness X of the wear of the brake pad 113.

Therefore, the wear amount of the brake pad 113 may be estimated using a change in the movement distance of the nut member 131.

As described above, the exemplary embodiment of the disclosure may estimates the wear amount of the brake pad 113 using the change in the movement distance of the nut member 131 so that the wear amount of the brake pad may be detected without installing a brake pad wear sensor. Accordingly, system may be achieved compactly and the product cost may be lowered.

Hereinafter, when the brake pad 113 is worn by the thickness X, estimating the wear amount of the brake pad 113 will be described.

FIG. 4 is a view illustrating a nut member in a parking operation standby position in the electronic parking brake system according to the exemplary embodiment.

Referring to FIG. 4, when the nut member 131 is in a parking operation standby position P1, the brake pad 113 and the brake disc 100 are not in contact with each other.

When the parking is released, the nut member 131 may wait at the parking operation standby position P1.

FIG. 5 is a view illustrating the nut member moving forward from the parking operation standby position to a parking operation position in the electronic parking brake system according to the exemplary embodiment.

Referring to FIG. 5, the controller 200 moves the nut member 131 forward from the parking operation standby position P1 to a parking operation position P2.

The controller 200 drives the electric motor 141 to move the nut member 131 in the forward direction, and detects the current flowing through the electric motor 141 while the nut member 131 moves in the forward direction. And, when the current value detected is greater than the preset value, the controller 200 may determine that the nut member 131 has reached the parking operation position P2. When the nut member 131, which is moved forward, presses the piston 121 by contacting the piston 121, the current flowing through the electric motor 141 increases rapidly. Accordingly, using such current change, the controller 200 may determine that the nut member 131 has reached the parking operation position P2. In addition, the present disclosure may directly detect the movement position of the nut member 131.

When the nut member 131 reaches the parking operation position P2, the controller 200 may stop the electric motor 141.

FIG. 6 is a view illustrating the nut member moved backward from the parking operation position to a parking complete release position in the electronic parking brake system according to the exemplary embodiment.

Referring to FIG. 6, the controller 200 moves the nut member 131 backward from the parking operation position P2 to a parking complete release position P3.

The controller 200 drives the electric motor 141 to move the nut member 131 in the reverse direction, and detects the current flowing through the electric motor 141 while moving the nut member 131 in the reverse direction. And, when the current value detected is greater than the preset value, the controller may determine that the nut member 131 has reached the parking complete release position P3. When the nut member 131, which is moved backward, is brought into close contact with the spindle member 135, the current flowing through the electric motor 141 increases rapidly. Accordingly, by using such current change, the controller 200 may determine that the nut member 131 has reached the parking complete release position P3. The parking complete release position P3 may be a fully release position with the nut member 131 maximally moved backward.

The controller 200 may estimate the wear amount of the brake pad 113 by using a movement distance in which the nut member 131 moves from the parking operation position P2 to the parking complete release position P3.

The movement distance of the nut member 131 may be calculated by a required time taken for the nut member 131 to move from the parking operation position P2 to the parking complete release position P3 or a motor speed during that time.

The controller 200 may estimate the wear amount of the brake pad 113 by comparing the movement distance of the nut member 131 from the parking operation position P2 to the parking complete release position P3 with a preset distance. At this time, the preset distance is a distance value corresponding to a reference thickness at which the brake pad 113 is not worn.

Therefore, the controller 200 may determine that the brake pad 113 is worn by a difference between the movement distance of the nut member 131 and the preset distance.

FIG. 7 is a flowchart illustrating control method of the electronic parking brake system according to the exemplary embodiment.

Referring to FIG. 7, first, the start is turned off by the driver in a state in which the driver finishes driving the vehicle and releases the parking.

The controller 200 determines whether the vehicle is in a start-off state (300). The controller 200 may receive starting state information of the vehicle from any one of various systems of the vehicle, and determine whether the vehicle is in the start-off state according to the received starting state information.

In operation 300, when the start-off state is checked, the controller 200 determines whether it is a time point to detect the wear of the brake pad 113 (310). The controller 200 receives driving record information of the vehicle from any one of various systems of the vehicle, and determines whether it is the time point to detect the wear of the brake pad 113 with the received driving record information. For example, when a traveling distance is equal to or greater than a predetermined traveling distance, the controller 200 may determine it as a brake pad wear time point.

In operation 310, when the time point to detect the wear of the brake pad 113 is checked, the controller 200 performs the parking apply operation (320). At this time, the controller 200 drives the electric motor 141 to move the nut member 131 forward such that the nut member 131 moves forward from the parking operation standby position P1 to the parking operation position P2.

The controller 200 performs a parking complete release operation after completing the parking apply operation (330). The controller 200 drives the electric motor 141 to move the nut member 131 positioned at the parking operation position P2 backward from the parking operation position P2 to the parking complete release position P3, by the parking apply operation.

The controller 200 counts time while the nut member 131 moves backward from the parking operation position P2 to the parking complete release position P3 or counts the motor speed of the electric motor 141, and calculates the movement distance from the parking operation position P2 to the parking complete release position P3 (340).

The controller 200 determines whether a calculated movement distance L is equal to or greater than a preset distance Lref by comparing a calculated distance Lref with the preset distance Lref (350).

In operation 350, when the calculated movement distance L is equal to or greater than the preset distance Lref, the controller 200 determines that the brake pad 113 is worn over a predetermined level, thereby warning the driver of the wear of the brake pad 113 (360). At this time, the controller 200 may also display a pad wear warning on a display panel connected to the system.

FIG. 8 is a block diagram illustrating an electronic parking brake system according to another embodiment.

Referring to FIG. 8, the electronic parking brake system may include the controller 200, the current sensor 210, and a voltage sensor 230.

The current sensor 210 may be provided to detect the current of the electric motor 141.

The voltage sensor 230 may be provided to detect a voltage of the electric motor 141. The voltage sensor 230 may detect a voltage input to the electric motor 141. The voltage sensor 230 may detect a voltage input to the electronic parking brake system from a vehicle battery supplying power to the electronic parking brake system.

The controller 200 may determine a movement speed of the nut member 131 based on the motor current of the electric motor detected through the current sensor 210 and the motor voltage of the electric motor detected through the voltage sensor 230. For example, the movement speed of the nut member may be stored in advance so as to correspond to the motor current and the motor voltage of the electric motor.

The controller 200, when the nut member 131 moves from the parking operation position P2 to the parking complete release position P3, may determine the movement distance of the nut member 131 according to the movement speed of the nut member 131 and a movement time of the nut member 131. As such, without the rotary sensor 220, the movement distance of the nut member 131 may be determined using the current sensor 210 and the voltage sensor 230.

The controller 200 moves the nut member 131 from the parking operation position P2 to the parking complete release position P3 when the vehicle is in the start-off state, determines the movement distance of the nut member 131 based on the motor current and the motor voltage of the electric motor while the nut member 131 moves from the parking operation position P2 to the parking complete release position P3, and may estimate the wear amount of the brake pad 113 by comparing the determined movement distance of the nut member 131 with the preset distance.

As is apparent from the above, the electronic parking brake system according to another embodiment may detect the wear amount of the brake pads without installing the brake pad wear sensor, so that the system can be compactly implemented and the product cost can be lowered.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic parking brake system comprising:
   a pair of brake pads arranged on opposite sides of a brake disc;
   a piston configured to press at least one of the brake pads;
   a nut member configured to press the piston;
   a spindle member configured to move the nut member;
   an electric motor configured to rotate the spindle member; and
   a controller configured to move the nut member from a parking operation position in which the brake pads are pressed by a forward movement of the nut member to a parking complete release position in which the pressing on the brake pad is completely released by the a backward movement of the nut member, and estimate a wear amount of the brake pads by comparing the movement distance of the nut member from the parking operation position to the parking complete release position with a preset distance.

2. The electronic parking brake system of claim 1, wherein the parking complete release position is a position in which the nut member moved backward is in close contact with the spindle member.

3. The electronic parking brake system of claim 1, further comprising:
a current sensor configured to detect a current flowing through the electric motor;
wherein the controller detects the current flowing through the electric motor while moving the nut member in a reverse direction, and when a current value detected is greater than a preset value, the controller determines that the nut member has reached the parking complete release position.

4. The electronic parking brake system of claim 1, further comprising:
a current sensor configured to detect a current flowing through the electric motor; and
a voltage sensor configured to detect a voltage input to the electric motor;
wherein the controller determines a movement speed of the nut member based on the current and the voltage of the electric motor, and determines the movement distance of the nut member based on the determined movement speed and a movement time while the nut member reaches the parking complete release position from the parking operation position.

5. The electronic parking brake system of claim 1, further comprising:
a rotary sensor configured to detect a motor speed;
wherein, the controller detects the motor speed while the nut member reaches the parking complete release position from the parking operation position, and determines the movement distance of the nut member according to the detected motor speed.

6. The electronic parking brake system of claim 1, wherein the controller, when a vehicle is in a start-off state and a traveling distance of the vehicle is greater than a preset traveling distance, estimates the wear amount of the brake pad based on a change in the movement distance of the nut member.

7. An electronic parking brake system, comprising:
a pair of brake pads arranged on opposite sides of a brake disc;
a piston configured to press at least one of the brake pads;
a nut member configured to press the piston;
a spindle member configured to move the nut member;
an electric motor configured to rotate the spindle member;
a current sensor configured to detect a current flowing through the electric motor;
a voltage sensor configured to detect a voltage input to the electric motor; and
a controller configured to:
drive the electric motor to move the nut member from a parking operation position to a parking complete release position when a vehicle is in a start-off state;
determine a movement speed of the nut member based on the current and the voltage of the electric motor;
determine a movement distance of the nut member based on the determined movement speed and a movement time of the nut member while the vehicle reaches the parking complete release position from the parking operation position; and
estimate a wear amount of the brake pads by comparing the determined movement distance with a preset distance.

8. The electronic parking brake system of claim 7, wherein the parking operation position is a position of the nut member when the brake pad is pressed by a forward movement of the nut member, and
the parking complete release position is a position of the nut member when the pressing on the brake pad is fully released by a backward movement of the nut member.

9. The electronic parking brake system of claim 8, wherein the parking complete release position is a position in which the nut member moved backward is in close contact with the spindle member.

10. The electronic parking brake system of claim 8, wherein the controller detects current value of the electric motor when the nut member moves forward, and determines whether a current position of the nut member is the parking operation position based on the detected current value, and
the controller detects the current value of the electric motor when the nut member moves backward, and determines whether the current position of the nut member is the parking complete release position based on the detected current value.

11. A control method of the electronic parking brake system of claim 7, comprising:
driving the electric motor to move the nut member from the parking operation position to the complete parking release position when the vehicle is in the start-off state;
determining the movement speed of the nut member based on the current and the voltage of the electric motor;
determining the movement distance of the nut member based on the determined movement speed and the movement time of the nut member while the nut member reaches the parking complete release position from the parking operation position; and
estimating the wear amount of the brake pads by comparing the determined movement distance with the preset distance.

12. The method of claim 11,
in the nut member movement,
wherein the parking operation position is a position of the nut member when the brake pad is pressed by a forward movement of the nut member, and
the parking complete release position is a position of the nut member when the pressing on the brake pad is fully released by a backward movement of the nut member.

13. The method of claim 12,
in the nut member movement,
wherein the parking complete release position is a position in which the nut member moved backward is in close contact with the spindle member.

14. The method of claim 11, further comprising:
in the nut member movement,
when the nut member moves forward, detecting a current value of the electric motor and determining whether a current position of the nut member is the parking operation position based on the detected current value,
when the nut member moves backward, detecting the current value of the electric motor and determining whether the current position of the nut member is the parking complete release position based on the detected current value.

\* \* \* \* \*